April 12, 1938. G. X. HENSHAW 2,113,841
APPARATUS FOR RE-REFINING OIL
Filed Dec. 31, 1934 2 Sheets-Sheet 1
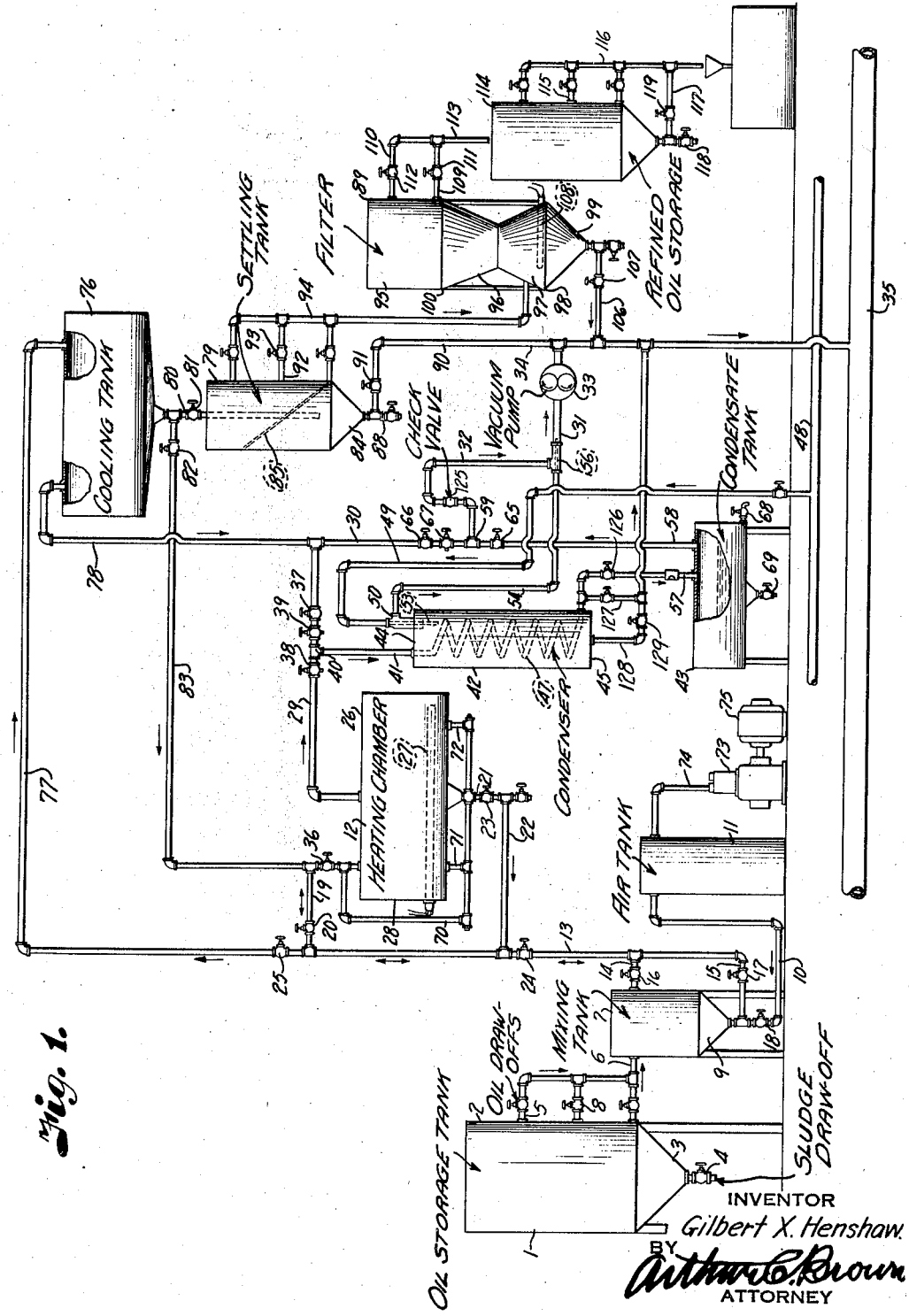
INVENTOR
Gilbert X. Henshaw.
BY
Arthur C. Brown
ATTORNEY April 12, 1938.　　　G. X. HENSHAW　　　2,113,841
APPARATUS FOR RE-REFINING OIL
Filed Dec. 31, 1934　　　2 Sheets-Sheet 2
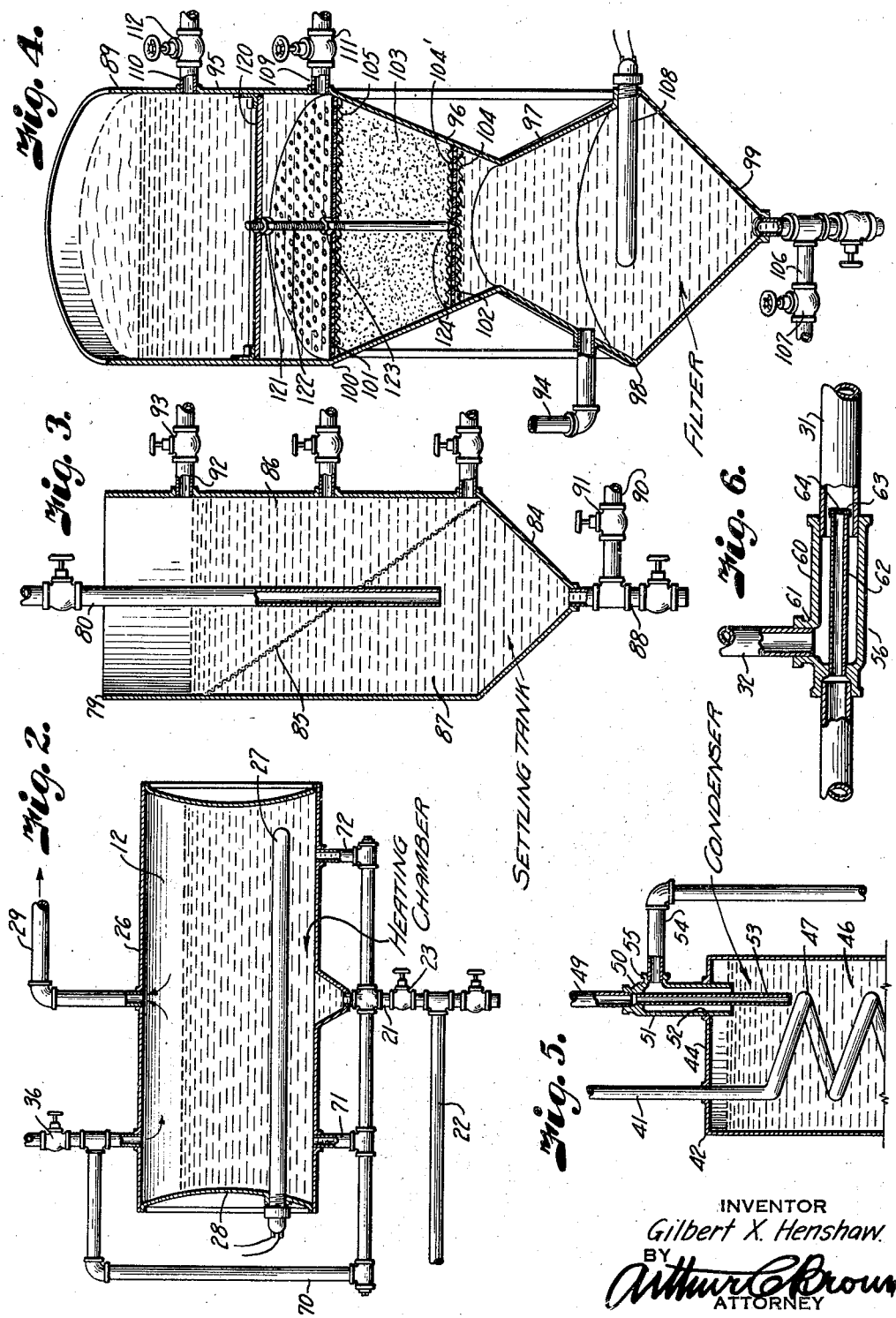
INVENTOR
Gilbert X. Henshaw
BY
ATTORNEY Patented Apr. 12, 1938

2,113,841

UNITED STATES PATENT OFFICE 2,113,841

APPARATUS FOR RE-REFINING OIL

Gilbert X. Henshaw, Kansas City, Mo.

Application December 31, 1934, Serial No. 759,919

12 Claims. (Cl. 196—16)

This invention relates to a method and apparatus for re-refining oil, particularly used lubricating oils, and has for its principal object to restore such oils to their original specification as to viscosity, specific gravity, flash point, acidity, color, and other characteristics by which good lubricating oils are known and classified.

Other important objects of the invention are to provide a method and apparatus whereby lubricating oils may be re-refined at minimum cost and to provide for quiet and particularly safe operation of a re-refining system, to eliminate fire hazards, to provide removal of all offensive odors from the system, and to provide means for utilizing the vacuum pump for handling the oil during its progress through the re-refining equipment.

In accomplishing these and other objects of the invention, as hereinafter pointed out, I have provided improved details of structure, the preferred form of which is illustrated in the accompanying drawings, wherein:

Fig. 1 is a schematic diagram of a re-refining system embodying the features of the present invention.

Fig. 2 is a vertical sectional view through the heating chamber or still employed in the system.

Fig. 3 is a vertical section through the settling tank.

Fig. 4 is a vertical section through the filter unit of the system.

Fig. 5 is a detail section through the upper end of the condenser in which gas, distilled from the lubricating oil, is condensed.

Fig. 6 is a detail sectional view of the spray device for drawing the condensing fluid from the condenser and spraying it into the gaseous vapors drawn from the system.

Referring more in detail to the drawings:

1 designates a storage tank for containing used lubricating oil which is to be re-refined as later described, and wherein a great deal of natural settling occurs in the oil to permit foreign matter to be drawn off as a sludge prior to delivery of the oil into the re-refining system. The storage tank 1 includes a cylindrical wall 2 having a cone shaped bottom 3 in which the sludge is collected and drawn off through a valve fitting 4 connected with the lowest point of the cone-shaped bottom 3 as illustrated in Fig. 1. The wall 2 of the tank is provided with a plurality of vertically spaced draw-off connections 5 communicating with a common pipe 6 leading to a mixing tank 7, each of the draw off connections 5 being provided with valves 8 for selectively closing the flow therethrough and whereby the oil may be drawn off at any one of the selected levels.

The mixing tank 7 conforms in shape to the storage tank 1 in that it has a cone-shaped bottom 9 which is connected by a pipe 10 with an air supply tank 11 through which air from the tank 11 is delivered for agitating oil contained therein and for mixing the oil with a treating agent such as fuller's earth, diatomaceous earth, or other of the various prepared purifiers which are now marketed for use in purifying oils and like liquids.

Due to the fact that used oils are diluted by volatile fluids, it is necessary to remove the dilution by distillation through the application of heat, which step is preferably performed prior to admixture of the treating agent. I also find that the oil when heated is more susceptible to the action of the reagent.

Therefore, prior to addition of the purifying agent the oil is first passed to a heating chamber 12 where its temperature is raised to 450° F. or more and then after it has cooled sufficiently it may be returned to the mixing tank for admixture of the purifying agent. In the illustrated instance the oil is conveyed through a pipe 13 having branches 14 and 15 connected respectively with the upper portion of the mixing chamber and with the air supply pipe 10 at a point directly below the cone-shaped bottom 9, the branches 14 and 15 being provided with suitable valves 16 and 17 to control flow therethrough as later described. The air supply pipe 10 is also provided with a similar valve 18 to shut off supply of compressed air to the mixing tank prior to mixing of the purifying agent with the used oil. The pipe 13 connects a pipe 19 through a cross over line having a valve 20 therein, and which is connected with the upper portion of the heating chamber 12. The pipe 13 is also connected with a drain pipe 21 leading from the bottom of the heating chamber through a cross over line 22, a valve 23 being located in the drain pipe 21. The pipe 13 is also provided with valves 24 and 25 located on the outer respective sides of the points of connection of the pipes 19 and 22 therewith to control flow of oil to and from the still as later described.

The heating chamber 12 may be of any suitable type, but is here shown as comprising a horizontally arranged cylindrical tank 26 having an electric heating element 27 extending into the tank from one end 28 thereof in slightly spaced relation with the bottom of the tank so that the heating element is located in the body of the oil and above any water that may collect in the bottom thereof.

Upon heating of the oil, the volatile diluents contained therein are distilled and drawn off through a pipe 29 connected with the top of the heating chamber 12. Should there be moisture entrained with the oil, this moisture will be driven off in the form of steam, together with the distilled vapors.

In order to cause movement of the oil from the mixing tank 7, the pipe 29 is connected with a pipe 30 which in turn is connected to a pipe 31 through a connecting branch 32, the pipe 31 being connected with the intake of a pump 33 preferably of the gear type for creating a vacuum in the system, the discharge side of the pump being connected with a pipe 34 leading to a waste pipe 35. Thus, upon operation of the vacuum pump, the pressure within the heating chamber is brought below the atmospheric pressure so that the air acting on the body of liquid in the mixing chamber causes movement thereof into the heating chamber when the valves 17, 24, 20, and 36 are opened and the valves 16, 23, and 25 are closed, the oil being discharged from the mixing chamber through the pipes 15, 13, and 19 into the heating chamber. After the body of oil has been transferred into the heating chamber, the valve 36 that is located in the pipe 19 is closed to cut off communication of the heating chamber with the rest of the system through the pipe 19. The oil is then brought to the desired temperature to cause vaporization of the volatile products contained in the oil which are removed through a pipe 29 upon closing a stop valve 37 connected therein and which shuts off direct communication of the line 29 with the vacuum pump 33.

Located between stop and waste valves 38 and 39 which are connected in the pipe 29 adjacent the valve 37 is a T-fitting 40 that is connected by a pipe 41 with a condenser 42 wherein the volatile elements are passed and delivered to a condensate tank 43. The condenser 42 may be of any conventional design, but is shown as including a vertically arranged cylindrical tank having closed ends 44 and 45 for containing a body of condensing fluid 46 to maintain a coil 47 therein and which is connected in the line 41 at a suitable temperature to cause condensation of the condensible vapors flowing therethrough. The condensing fluid is delivered from a supply line 48 through a branch line 49 leading to a fitting 50 that is connected with the upper end 44 of the condensing chamber.

The fitting 50 includes a cylindrical body 51 welded or otherwise sealed within an opening 52 in the top of the condenser tank and having its lower end communicating directly with the interior of the tank. The upper end of the fitting, however, is closed and connected with the branch pipe 49.

In order to deliver the condensing fluid at a point spaced below the open end of the fitting 50, a tube 53 of smaller diameter than the diameter of the fitting is sleeved therein and threaded into the upper end thereof for closed communication with the branch 49 in such a manner that the condensing fluid from the branch 49 is delivered through the tube 53 into the tank at a material distance below the open end of the fitting 50 and into direct contact with the inlet end of the condenser core.

The condensing liquid is thus delivered at the hottest end of the coil to absorb heat of the coil and cause condensation of the volatile products. As the condensing liquid becomes heated, circulation will be established within the tank causing the hot liquid to move upwardly toward the open end of the fitting 50 from where it is drawn off through a pipe 54 that is connected to a laterally extending neck 55 on the fitting 50 and which connects with a nozzle 56 inserted in the pipe 31 leading to the vacuum pump. This construction effects removal of the water by the pump at the same rate as it enters the condenser. Since the water is drawn through the pump it acts as a lubricating and cooling medium to maintain the pump in cool condition. The pump has a greater capacity than that required to move the water so as not to interfere with the vacuum seal for the pump.

The lower end of the coil 47 connects with the upper portion of the condensate tank through a pipe 57 forming a continuation of the pipe 41 so that the condensate and non-condensible vapors are delivered together to the condensate tank where the non-condensible vapors separate and are drawn off through the pipe 58 connected with the pipe 30 at the point of connection with the pipe 32 by a T-fitting 59.

The nozzle 56 includes a cylindrical body member 60 arranged in axial relation with the pipe 31 and with its opposite end connected to the pipe 54 and has a lateral connection 61 for connecting the pipe 32.

Fixed concentrically within the nozzle body 60 in communication with the discharge end of the pipe 54 is a tube 62 having its opposite end extending within the inlet end of the pipe 31 and provided with a cap 63 having an orifice 64 through which the condensing fluid is atomized under action of the vacuum pump 33 to cause saturation of non-condensible vapors drawn from the tank 43 before they are delivered to the waste pipe 35. The condensing fluid absorbs all of the offensive odors from the vapors and eliminates the possibility of a fire or explosion due to friction in the pump as all of the explosive vapors are absorbed by the condensing fluid before passing to the pump.

Located on the respective sides of the T-fitting 59 are stop valves 65 and 66 and a stop and waste valve 67 so that when the condensing portion of the system is in operation, the valve 66 is closed and the valve 65 is opened so that the non-condensible vapors are drawn off through the pipe 29, condenser coil 47, condensate tank 43 and pipe 32 and mixed with the water spray discharged from the orifices 64.

The light condensate collecting in the tank 43 may be drawn off through a cock 68 while the water or heavy condensate which collects at a lower level in the tank is drawn off through a drain valve 69 connected with the bottom of the tank.

During heating of the oil, any water content thereof is vaporized in the form of steam which moves at extremely high velocity through the body of heated oil producing violent agitating action within the still which produces a thumping and pounding effect within the heating chamber.

In order to overcome this difficulty, I provide for equalizing forces acting on the respective sides of the body of fluids contained in the heating chamber to slow down movement of the vapors by drawing the heat toward the bottom of the chamber. This is accomplished by a by-pass pipe 70 having its upper end connected with the pipe 19 below the valve 36 and its lower end connected with the bottom of the tank by branches 71 and 72 connected with the respective ends of the bottom of the tank, and with the drain pipe 21 that is located intermediate the ends of the tank as best illustrated in Fig. 2.

Therefore, the same vacuum force acts on the lower side of the body of the oil that is acting on the upper side, tending to prevent violent agitation of the liquid during the heating process and to effect a more even distribution of heat through the fluids.

After the oil has been brought to a temperature, for example 450° F., the oil is allowed to cool to a sufficient degree and the stop and waste valve 38 is closed to open the line 29 to atmosphere and the valves 23, 24 and 16 are opened to allow gravitational flow of the oil back to the mixing tank. The purifying agent is then added to the oil during agitation by the jet of compressed air delivered from the tank 11 when the valve 18 is opened and the valve 17 closed.

Air pressure is maintained within the tank 11 by means of a compressing unit including an air compressor 73 that is connected with the tank by a pipe 74 and which is operated by a suitable prime mover, such as a motor 75.

After the oil and treating agent have been thoroughly agitated and the treating agent is contained in suspension in the oil, the oil is delivered to a cooling or handling tank 76 and allowed to cool to the desired temperature.

The cooling tank 76 is preferably of cylindrical shape and is connected with the mixing tank through the pipe 77 that connects with the pipe 13.

In order to cause flow of the oil into the cooling tank, the upper portion of the cooling tank is connected by a pipe 78 with the pipe 29 wherethrough a vacuum is drawn into the cooling tank to cause lifting of the oil from the lower level of the mixing tank.

It is thus apparent that when the valves 23, 20, and 36 are closed and the valves 17, 24, and 25 are opened oil will be diverted from the heating chamber so that it will pass through the pipe 77 into the tank 76. If desired the oil may be initially elevated from the mixing tank into the heating chamber preparatory for heating by drawing the vacuum therein through the condenser 45, and through condensate tank 43 in the same manner as described in connection with drawing of the vapors from the heating chamber. With this method the valves 37 and 66 are left closed so that the pump draws all of the vacuum in the heating chamber through the condenser thereby withdrawing any vapors that may be in the still and condensing them for retention in the condensate tank, which vacuum is maintained throughout the distilling operations thus simplifying manipulation of the valves.

In some instances, particularly when the system is to be operated continuously, the oil, after being brought to the desired temperature in the heating chamber, may be removed directly to the cooling tank 76, thereby releasing the heating chamber for another charge of oil from the tank 1. When large volumes of oil are to be treated, this is the most efficient method as the heating chamber is still in heated condition. However, when the heating chamber has been recharged with the second batch, the first batch, after preliminary cooling in the tank 76 is returned to the mixing tank for admixture of the treating material. After the oil has been treated it is again returned to the cooling tank for flow through the settling and filtering portion of the system, as later described. When the heated oil is to be removed from the heating chamber to the cooling tank, the vacuum in the heating chamber is admitted to the tank 76 upon opening valve 37. After pressures in the heating chamber and tank 76 have approached equalization, the valves 24 and 20 are closed, the stop and waste valve 38 is opened to atmosphere and the valves 25 and 23 are opened. The pump then draws vacuum in the tank 76 through the lines 32 and 58, distillate tank 43, line 57 through condenser coil 47 and lines 41, 29, and 78 to draw the oil through the lines 21, 22 and 77 into the cooling tank. After the oil has been transferred, the valves 23 and 25 are closed and the stop and waste valve 38 is closed to atmosphere, which again allows a vacuum to be drawn in the heating chamber. Then the valves 24, 20, and 36 are opened so that another charge of oil is drawn into the heating chamber from the mixing tank. Valve 36 is then closed. When the oil has cooled sufficiently, the valve 66 being closed, the valve 39 is opened to atmosphere, after which the valve 82 in line 83 is opened, allowing the cooled oil to flow by gravity back to the mixing tank for admixture with the treating material. The treated oil is then returned to the tank 76 for flow through the settling and filtering part of the system now described. After the oil in the mixing chamber has been elevated to the tank 76 and the valves 25 and 66 are closed, the oil will be moved to a settling tank 79 through a drain pipe 80 communicating with the lower portion of the settling tank upon opening of a valve 81 in the pipe 80 and closing a valve 82 in a pipe 83 that is connected with the pipe 80 and with the pipe 19 previously described, air being let into the tank by opening the stop and waste valve 39 which closes the remainder of pipe 29.

The settling tank 79 is vertically arranged below the cooling tank and has a cone-shaped bottom 84 similar to the cone-shaped bottoms of the storage and mixing tanks previously described.

Extending diagonally across the interior of the tank is a screen diaphragm 85 separating the tank into upper and lower compartments 86 and 87, the lower compartment 87 communicating with the drain pipe 88 and the upper compartment with a filter 89 wherein the settled oil is filtered from the treating agent.

The bottom end of the settling tank is connected by a pipe 90 for discharge into the waste pipe 35 so that solid matter precipitating in the settling tank may be drawn off in the form of sludge upon opening of a valve 91 that is connected in the pipe 90 at a point adjacent the drain outlet of the settling tank.

Up to this point in the system, the purifying agent has been performing the functions of absorbing carbon, neutralizing acidic compounds, coagulating saponifiable compounds and restoring color to the oil. It is now necessary to draw off the treated oil and remove the treating material.

The oil may be drawn off at any selected level within the settling tank through one of a plurality of vertically spaced draw-off connections 92 which are provided with valves 93 and connected with a common pipe 94 leading to the filter 89 wherein the treating material is removed, as now to be described.

The filter 89 is best illustrated in Fig. 4 and is shown as including an upper cylindrical wall portion 95 terminating at its lower end in an inverted frusto-conical wall 96 which in turn terminates in an oppositely arranged frusto-conical wall portion 97 which has its base portion 98 closed by an inverted conical bottom 99. Located at the base 100 of the cylindrical wall portion 95 is a perforated diaphragm 101 which cooperates with a similar diaphragm 102 extending across the lower portion of the frusto-conical wall 96 for supporting a filter bed 103.

The opposite sides of the lower diaphragm 102 and the under side of the upper diaphragm 101 are covered with layers of filtering cloth or paper 104, 104' and 105 respectively to cooperate with the diaphragm in retaining the filter material forming the bed 103 therebetween and to prevent foreign matter suspended in the oil under filtration from entering the filtering material.

The pipe 94 which delivers the oil from the settling tank connects with the frusto-conical portion 97 of the filter at a point slightly above the base 98 thereof so that the oil is delivered under the filter bed for upward flow therethrough into the cylindrical portion of the filter.

Due to the outwardly and downwardly inclined wall portion 97, it is impossible for any of the solid matter contained within the oil stream to collect thereon, but it is caused to precipitate into the cone-shaped bottom 99 from where it is drained to the waste duct 35 through a branch pipe 106 having a valve 107 connected with the pipe 34. The settlings may also be drained through a drain valve into another container.

Under certain conditions, it may be desirable to heat the oil so that it will readily pass through the filter bed and this may be accomplished by providing the inlet chamber of the filter with an electric heating element as indicated at 108. After passing through the filter bed, the oil is entirely freed of the treating agent since this material cannot pass therethrough. Consequently, the impurities are absorbed thereby.

After the filtered oil has collected in the cylindrical portion 95 of the filter, it may be drawn off through either one of the draw off pipes 109 and 110 upon opening of one of the valves 111 and 112, the pipes 109 and 110 communicating with a common pipe 113 discharging into a re-refined oil storage tank 114 which is also provided with a plurality of vertically spaced draw off connections 115 connected by a common pipe 116 so that the re-refined oil can be drawn off at any one of the selected levels by opening the valve at the desired point of draw off.

The bottom of the storage tank is provided with a cone shaped bottom which is likewise connected with the pipe 117 or the oil may be drawn directly from the bottom of the tank through a valve 118 connected with the pipe 117 ahead of the valve 119 therein.

In order to seat the peripheries of the screens in wedging contact with the conical wall 96 to prevent passage of the filtering element therebetween, a cross bar 120 is extended diametrically across the cylindrical wall portion of the filter at a point above the upper screen to form an abutment against which a nut 121 on a threaded rod 122 abuts. The rod 122 extends axially through the upper diaphragm and is provided with a nut 123 and a tapered end 124 engaging the upper sides of the upper and lower diaphragms respectively in opposition to the pressure applied to the rod by the nut 121.

The use of the mechanical pump for handling the oil and the removal of the vapors is made possible by the water from the condenser. This water cools and lubricates the pump and eliminates all danger of fire or explosion and enables the pump to handle the vapor and the oil without the oil coming in contact with the water.

In order to further eliminate danger of fire hazards and loss of vacuum in case of failure of the pump, I have provided a check valve 125 in the line 32 so that if the source of vacuum should fail or if an explosion should occur in the pump the valve would close, holding the vacuum in the remainder of the equipment, and preventing any flash back through the pipes to the heating chamber or condensate tank.

If it is desired to use the pump for lifting oil from one container to another the heating chamber may be operated by closing the valve 126 in the line 57 and diverting the vapors through a pipe 127 to the waste line 35, water being drained from the bottom of the condenser through a pipe 128 to the pipe 127 for saturating the vapors. The flow of water in the pipe 128 is controlled by a valve 129.

From the foregoing, it is obvious that I have provided mechanism for re-refining lubricating oil in which the oil is handled entirely by vacuum created by a mechanical pump and that all fire or explosion hazard is eliminated and that I have provided means for cooling and lubricating the pump and removing the offensive odors from the system without contaminating the oil being handled by the pump.

What I claim and desire to secure by Letters Patent is:

1. In an apparatus for re-refining a liquid of the character described, a heating chamber for heating the liquid to vaporize volatile products contained in the liquid, vacuum means for drawing off the vapors, a condenser element connected with the heating chamber for condensing the vapors, a condenser jacket surrounding said element, a condensate receptacle connected with the condenser element, means connecting the vacuum means with the receptacle to draw off the non-condensable vapors, and means actuated incidental to operation of the vacuum means for withdrawing condensing liquid from said jacket and for spraying moisture into the non-condensable vapors withdrawn by said vacuum means.

2. In an apparatus for re-refining a liquid of the character described, a heating chamber for heating the liquid to vaporize volatile products contained in the liquid, vacuum means for drawing off the vapors, means for equalizing pressures on the upper and lower sides of the liquid in the heating chamber, a condenser element connected with the heating chamber for condensing the vapors, means confining a condensing liquid for movement in heat exchange relation with said condenser element, a condensate receptacle connected with the condenser element, means connecting the vacuum means with the receptacle to draw off the non-condensable vapors, and means actuated incidental to operation of the vacuum means for drawing moisture into the non-condensable vapors withdrawn by said vacuum means.

3. In an apparatus for re-refining a liquid of the character described, a heating chamber for heating the liquid to vaporize volatile products contained in the liquid, vacuum means for drawing off the vapors, means for equalizing pressures on the upper and lower sides of the liquid in the heating chamber, a condenser element connected with the heating chamber for condensing the vapors, means confining a condensing liquid for movement in heat exchange relation with said condenser element, means supplying a condensing liquid to said confining means, a condensate receptacle connected with the condenser element, means connecting the vacuum means with the receptacle to draw off the non-condensable vapors, and means actuated incidental to operation of the vacuum means for drawing the condensing liquid into the non-condensable vapors withdrawn by said vacuum means.

4. In an apparatus for re-refining a liquid of the character described, a mixing tank, a heating chamber connected with the mixing tank for heating the liquid to vaporize volatile products contained in the liquid, vacuum means for drawing off the vapors, a condenser element connected with the heating chamber for condensing the vapors, means confining a condensing liquid for movement in heat exchange relation with said condenser element, a condensate receptacle connected with the condenser element, means connecting the vacuum means with the receptacle to draw off the non-condensable vapors, means actuated incidental to operation of the vacuum means for drawing moisture into the non-condensable vapors withdrawn by said vacuum means, and means connecting the vacuum means with the mixing tank for moving the liquid from the mixing tank to the heating chamber.

5. In an apparatus for re-refining a liquid of the character described, a mixing tank, a heating chamber connected with the mixing tank for heating the liquid to vaporize volatile products contained in the liquid, vacuum means for drawing off the vapors, means for applying effects of said vacuum means on the upper and lower sides of the liquid in the heating chamber, a condenser element connected with the heating chamber for condensing the vapors, means confining a condensing liquid for movement in heat exchange relation with said condenser element, means for supplying a condensing fluid to said confining means, a condensate condenser element connected with the receptacle to draw off the non-condensable vapors, means actuated incidental to the vacuum means for drawing the condensing liquid into the non-condensable vapors withdrawn by said vacuum means, and means connecting the vacuum means with the mixing tank for moving the liquid to be re-refined to the heating chamber.

6. In an apparatus for re-refining a liquid of the character described, a heating chamber for heating the liquid to vaporize volatile products contained in the liquid, vacuum means for drawing off the vapors, a cooling tank, a conduit connecting the heating chamber with the cooling tank, a conduit connecting the cooling tank with said vacuum means, valves in said conduits for effecting transfer of the liquid from the heating chamber to the cooling tank incidental to operation of the vacuum means and for maintaining said vacuum on the liquid when retained in said cooling tank, a condenser, means connecting the condenser with the heating chamber and with said cooling tank, means connecting the condenser with said vacuum means for withdrawing vapors from the chamber and cooling tank through said condenser, and means for introducing a non-combustible liquid into the vapors.

7. In an apparatus for re-refining a liquid of the character described, a heating chamber for heating the liquid to vaporize volatile products contained in the liquid, vacuum means for drawing off the vapors, a cooling tank, a conduit connecting the heating chamber with the cooling tank, a conduit connecting the cooling tank with said vacuum means, valves in said conduits for effecting transfer of the liquid from the heating chamber to the cooling tank incidental to operation of the vacuum means and for maintaining said vacuum on the liquid when retained in said cooling tank, a condenser, means connecting the condenser with the heating chamber and with said cooling tank, means connecting the condenser with said vacuum means for withdrawing vapors from the chamber and cooling tank through said condenser, means for introducing a non-combustible liquid into the vapors, and means for opening said conduits to atmosphere to allow transfer of the liquid under the influence of the vacuum means.

8. In an apparatus for re-refining a liquid of the character described, a heating chamber for heating the liquid to vaporize volatile products contained in the liquid, a condenser, means connecting the condenser with the heating chamber, vacuum means for drawing off the vapors from the heating chamber through said connecting means, means connecting the condenser with said vacuum means, means for circulating a condensing liquid through the condenser responsive to said vacuum means to condense and cool the vapors, and means for delivering a cooling liquid to the vacuum means for direct contact with any vapors drawn through the vacuum means which have not condensed in the condenser.

9. In an apparatus for re-refining a liquid of the character described, a heating chamber for heating the liquid to vaporize volatile products contained in the liquid, a condenser, means connecting the condenser with the heating chamber, vacuum means for drawing off the vapors from the heating chamber through said connecting means to the condenser, means connecting the condenser with said vacuum means, a check valve in said last named connecting means, means for circulating a condensing fluid in heat exchange relation with the vapors moved through the condenser responsive to said vacuum means, and means for introducing a condensing liquid into said last named connecting means for direct contact with any vapors drawn through the vacuum means which have not condensed in said condenser.

10. In an apparatus for re-refining a liquid of the character described, a heating chamber for heating the liquid to vaporize volatile products contained in the liquid, vacuum means for drawing off the vapors, a condenser element connected with the heating chamber for condensing the vapors, means for supplying a condensing liquid in heat transfer relation with the condenser element, a condensate receptacle connected with the condenser element, means connecting the vacuum means with the receptacle to draw off the non-condensable vapors, and means actuated incidental to operation of the vacuum means for drawing condensing liquid into the non-condensable vapors withdrawn by said vacuum means.

11. In an apparatus for re-refining a liquid of the character described, a tank, a heating chamber for heating the liquid to vaporize volatile products contained in the liquid, a vacuum pump, means connecting the vacuum pump with the heating chamber for withdrawing said vaporized products, means actuated incidental to operation of the pump for drawing dampening liquid into said connecting means at a point ahead of the vacuum pump for contacting any of said vapors before they are drawn into the pump and for sealing and cooling said pump, and means connecting the heating chamber with the tank for moving the liquid to be re-refined to the heating chamber in response to operation of said vacuum pump.

12. In an apparatus for re-refining a liquid of the character described, a heating chamber for heating the liquid to vaporize volatile products contained in the liquid, a vacuum pump for drawing off the vapor, means connecting the vacuum pump with the heating chamber for passage of the vapors, and means connected in said connecting means at a point ahead of the pump and actuated incidental to operation of the vacuum pump for drawing a dampening liquid directly into the vapors before they are drawn into the pump whereby said dampening liquid seals, lubricates and cools the pump to prevent explosion of said vapors.

GILBERT X. HENSHAW.